US006462259B1

(12) United States Patent
Chapman

(10) Patent No.: US 6,462,259 B1
(45) Date of Patent: Oct. 8, 2002

(54) NUT ASSEMBLY FOR STRINGED MUSICAL INSTRUMENT

(76) Inventor: Emmett H. Chapman, 6011 Woodlake Ave., Woodland Hills, CA (US) 91367-3238

( * ) Notice: Subject to any disclaimer, the term of this patent is extended or adjusted under 35 U.S.C. 154(b) by 1 days.

(21) Appl. No.: 09/698,407

(22) Filed: Oct. 30, 2000

(51) Int. Cl.[7] .................................................. G01D 3/06

(52) U.S. Cl. .................................. 84/314 N; 84/314 R

(58) Field of Search ........................... 84/314 N, 314 R, 84/312 R, 315

(56) References Cited

U.S. PATENT DOCUMENTS 4,574,678 A * 3/1986 Edwards .................... 84/314 N
5,932,822 A * 8/1999 Bernstein .................. 84/314 N

* cited by examiner

*Primary Examiner*—Robert E. Nappi
*Assistant Examiner*—Kim Lockett
(74) *Attorney, Agent, or Firm*—J. E. McTaggart

(57) ABSTRACT

A height-adjustable nut assembly for stringed musical instruments can be implemented as a single elongate nut block that can be height-adjusted at each end, or as two such nut blocks disposed end-to-end. The nut block has a cross-sectional shape that provides at row of V-shaped channels for string support and guidance. A primary embodiment has a stabilizing flange extending from the bottom portion of the nut block toward the instrument body region. The nut block is adjustably supported by tripod mounting system including a pair of set-screws in the nut block under the channels and a fastening screw through the stabilizing flange, which is compressibly spaced from a support landing machined in the neck. A step formed by the landing is utilized for anti-rotation. The V-shape of the string support channels accommodates all sizes and tunings of strings with precise center-to-center spacing assured, and provides increased clearance for thicker strings. For an instrument with more than six strings and/or with strings arranged in two tuning groups. and particularly for an instrument to be played with a two-handed tapping technique, such as The Chapman Stick, two nut blocks may be deployed end-to-end: each adjustable independently at each end by the set-screws, unimpeded by the fastening screw and compressible spacer, thus enabling easy precise adjustment of optimal string-to-fret clearance independently for each string tuning group. A secondary embodiment, wherein the nut block is configured with no flange, may be implemented in several versions, some with rear access for adjustment.

20 Claims, 5 Drawing Sheets

NUT ASSEMBLY FOR STRINGED MUSICAL INSTRUMENT

FIELD OF THE INVENTION

The present invention relates to the field of musical instruments, and more particularly, in the field of stringed musical instruments it relates to improved structure in a nut assembly for string support that provides adjustment for string clearance to satisfy the string setup demands of the conventional guitar family as well as the more exacting demands of instruments designed to be played with a two-handed string-tapping technique. such as The Chapman Stick.

BACKGROUND OF THE INVENTION

In stringed instruments such as guitars, typically a neck portion including a fingerboard, extends from a body portion to an integral headstock which carries tuning pegs and their mechanisms. The strings are stretched over two basic support points; the first known as the bridge, located in the body region, and the second known as the nut, located between the fingerboard and the headstock. The distance between these two support points, in conjunction with the string tension and mass, determines the vibrational resonant frequency and thus the musical pitch of an open string.

The player can increase the pitch by stopping the string, i.e. pressing it against the fingerboard, which may be smooth and fretless as in a violin, but more commonly in the lute/guitar family, made as a fretboard with transverse frets spaced to form the chromatic musical scale. To raise the pitch a semitone from open tuning the player finger-stops the string at the first fret by placing a finger on the string between the nut and the first fret and pressing it against the fret, thus moving the second support point closer to the bridge, which remains fixed as the primary support point. This shortens the vibrational string length and increases the pitch a semitone higher than the open string pitch. The player then plays the note by picking, plucking or strumming the string with the other hand with a velocity that determines the initial amplitude and loudness, then the note rings with diminishing amplitude until it dies out at the end of the sustain time.

In the case of tapping technique, by quickly and cleanly pressing a string against a fret and holding it there: the burst of energy imparted as momentum by the velocity of the initial displacement becomes converted to vibrational energy that determines the initial amplitude and loudness, then, as in conventional technique, the note rings with diminishing amplitude until it dies out at the end of the sustain time. Since the tapping technique eliminates the need to pick, pluck or strum the strings, both hands can be dedicated to playing notes on the fretboard, more strings can be utilized, typically eight, ten or twelve, and thus the player's versatility and virtuosity are potentially doubled. For the tapping technique the demands for accurate string-to-fret spacing are more exacting, therefore, prior to the present invention, all Chapman Stick instruments were made with individual string height adjustments at the nut.

Conventional fretboards are typically made with a transverse convex curvature, while the Chapman stick is made flat; in either case each fret is made to be constant in height above the fingerboard. The two string support points are initially set up for height to provide a desired "action" as determined by the spacing between the bottoms of the strings and the tops of the frets. This is usually made different for different string sizes, and is usually set as low as possible for ease of playing, while avoiding any buzzing due to vibrating strings coming into contact with higher frets. There is almost always a succession of strings of different diameters, which all need to be accurately spaced from the frets for optimal overall playing action, for which both the bridge and the nut must be set accurately.

The bridge establishes the height and inter-string spacing at the first support point, which principally determines the action over the entire fretboard. When a string is finger-stopped at any fret, the bridge height for that string sets the fret-to-string clearance at all higher frets, and since these all face the vibrating portion of the string, they require sufficient clearance. In many guitars the bridge height is adjustable by rotating a pair of thumb-finger screw adjustment wheels, one at each end of the bridge. In some professional-quality guitars and in all models of the Chapman Stick, the bridge is equipped with individual height adjustments for each string.

At the other support point, in both conventional guitars and tapping type instruments the height of the nut support point also affects the overall action importantly, since it affects the amount of string displacement required to finger-stop or to tap a string at a fret, particularly toward the nut end. However, the string-to-fret clearances are affected by nut height only when the string is played open: with a string finger-stopped at a fret, clearance for the vibrating string portion depends entirely on the bridge height. Thus a guitar requires the nut to made high enough to prevent vibrating string contact with any fret, particularly the first fret.

A higher action setting makes finger-stopping and tapping more difficult due to the geometrically required stretching and vertical bending of the strings, particularly at the first fret.

With the string-tapping technique, open strings are normally not played, and generally the maximum vibration amplitude is smaller on all strings than with conventional guitar playing techniques. Thus, for tapping-type instruments, it has been found possible and desirable to set up the instrument for much lower action: in particular the nut can be set to make the first fret-to-string spacing much closer on all strings, which greatly enhances the ease of playing with the tapping technique, particularly at the first and lower frets.

Typically the guitar nut is made from a hard material such plastic, bone or metal, and is placed in a fixed location, typically held with adhesive, providing only a general purpose string height setting that is not user-adjustable.

The nut is typically configured on top with a series of notches known as saddles, one for each string, that function to constrain the strings laterally, to keep them spaced apart uniformly, and to support them at the correct height above the first fret to set the desired string-to-fret clearances.

A greater clearance must be set between the bottoms of the strings and the tip of first fret for larger strings due to their increased vibrational excursions. The strings typically vary in diameter, ranging in a sequence from thinnest to thickest along the fret to provide a single tuning group.

On guitars, the saddle notches are usually saw-cut to be approximately rectangular in cross-section; they may be made different in width to laterally constrain different sized strings and different in depth for different fret clearances requirements of different sized strings. These variations are difficult to standardize, and restrictive with regard to altered tunings and/or string gauges, leading to substantial burdens, problems and costs in original manufacture, field use, maintenance and repair, often requiring costly, tedious sawing and filing operations that must be performed manually on individual saddle notches by skilled technicians attempting to obtain optimal playing action. Excessive sawing or filing can destroy the nut due to loss of sufficient string clearance at the first fret, and the nut would then have to be removed and replaced with a new one.

Despite these shortcomings, the conventional fixed nut system is considered to be cost-effective and generally satisfactory for many basic conventional stringed instruments with only four or six strings in a single tuning group. However, it may become troublesome in instruments with eight or more strings, particularly if the strings are arranged in two or more tuning groups. For example, in The Chapman Stick, standard models have ten strings divided into two tuning groups of five; very low playing action, i.e. close string-to-fret spacing, is particularly important for the string tapping technique.

DISCUSSION OF KNOWN ART

U.S. Pat. No. 4,304,203 by Siminoff, for an ADJUSTABLE NUT FOR STRINGED MUSICAL INSTRUMENTS discloses individual string height adjustment implemented by individual saddle pieces, one for each string (or pairs thereof) each threaded into a common nut bar.

U.S. Pat. No. 3,429,214, by Jones, for a NUT-MOUNT FOR FINGERBOARDS discloses a common nut bracket to which are attached individual string nuts and support members, one for each string, individually adjustable with a set screw for string height, with saddles formed by separate side guides and low-friction cylindrical roller nut mounting to allow strings to return to normal tension after release of playing pressure.

U.S. Pat. No. 3,599,524, also by Jones, for a NUT-MOUNT FOR STRINGED MUSICAL INSTRUMENT FINGERBOARDS discloses individual string nuts with structure similar to the aforementioned patent, with the further capability of adjustably offsetting the individual nut supports longitudinally along the strings for correcting the tuning of fretted and fretless instruments.

U.S. Pat. No. 5,173,565 for ROLLER BRIDGE SADDLE by Gunn discloses a “roller string guide for a musical instrument, such as a roller bridge saddle”, with a special rigid seated bearing structure to preserve vibrational energy and enhance sustain. The saddle notch provided by the roller is shown configured with a V-shaped cross-section.

U.S. Pat. No. 5,260,504 STRING SUPPORT FOR STRINGED INSTRUMENT by Turner discloses a nut and/or saddle that supports each string being on a pair of freely-rotatable ball bearings, allowing unrestricted forward and backward movement for maintaining the pitch of the string.

Similarly U.S. Pat. Nos. RE36,484 to Turner, U.S. Pat. No. 2,191,776 to Schreiber, U.S. Pat. No. 2,959,085 to Porter, U.S. Pat. No. 4,709,612 to Wilkinson and U.S. Pat. No. 5,438,901 to Sperzel disclose nut assemblies that utilize rotatable supports such as balls or rollers for low friction including means such as cams, rollers of different diameter, and set screws for individually adjusting the string heights.

Providing individual height adjustment for each string or string pair is complex and costly to the extent that it has never become popular in the stringed instrument marketplace, where the economical one-piece nut structure has remained conventional and practically universal despite its shortcomings.

Many of the foregoing cited patents address concern regarding longitudinal movement of the strings at the nut, proposing as the solution anti-friction string support at the nut, such as pulleys, rollers or hall bearings. This concern pertains to conventional instruments under hard playing conditions and/or frequent manipulation of string tension by string-bending or operating a tension-lever known as a “whammy bar”.

In the field of instruments for string-tapping techniques, the playing method does not cause any appreciable movement of the strings on the nut, so such friction has not been found to be a matter of concern.

Similarly the need for individual or overall longitudinal adjustment at the nut addressed by some of the cited patents does not apply to the string-tapping technique: because notes on the open strings cannot be initiated by tapping the string against a fret, the open string notes are not normally played, instead, the lowest available note played on each string is played by tapping it onto the first fret. A damper is usually provided, located between the nut and first fret, to prevent unwanted ringing of open strings. Furthermore, in instruments for string-tapping technique the nut action can be set low and the nut can be located at the ideal fixed point with no need for longitudinal adjustment.

In general, most prior art is directed to problems and solutions that are not applicable to the string-tapping technique, while failing to address the special requirements of the string-tapping technique. Yet solutions addressing these requirements, such as in the present invention, are potentially applicable as well to guitars and other stringed instruments played in the conventional manner.

OBJECTS OF THE INVENTION

It is a primary object of the present invention to provide an improved nut assembly that provides satisfactory string support and enables simple adjustment of string-to-fret clearances and overall playing action in stringed instruments such as guitars as well as instruments made to be played with string-tapping technique.

It is a further object in the configuration of the nut to make the string-support saddle notches uniform in cross-sectional shape to facilitate manufacturing.

It is a further object to provide a nut assembly wherein a single nut unit can satisfactorily accommodate up to eight strings in a single tuning group.

It is a further object of the invention to provide an improved nut assembly that accomplishes satisfactory string-to-fret spacing and overall playing action for special stringed instruments having more than eight strings, particularly where the strings are arranged in two tuning groups.

It is a further object that the improved nut assembly be made to provide string height adjustment capability that satisfies the exacting requirements of very close string-to-fret clearance for stringed instruments designed to be played with two-handed tapping technique, such as The Chapman Stick.

It is a further object to make the nut assembly a neutral environmental element that is adaptable and reconfigurable to all tunings and string gauges and to both regular and reversed group tuning sequences, both in original manufacture and in the field.

It is a still further object to make the nut assembly, or each of the two nut units thereof, easily adjustable for height at each end, in infinite gradations.

SUMMARY OF THE INVENTION

The abovementioned objects have been accomplished by the present invention of an improved nut assembly that can be deployed as a single nut unit or two nut units aligned end-to-end. Each nut unit is provided with a pair of adjustable support legs located near the ends of the nut, made to bear the pressure from the stretched strings to the underlying neck region.

In conjunction with these two adjustable support legs, the nut requires stabilization to hold it generally perpendicular to the landing, to constrain it from rotating or shifting in any direction in a horizontal plane, and for pre-retention, i.e. retaining the nut in the absence of strings, for manufacturing and servicing purposes.

In a primary embodiment, the two support legs are implemented as a pair of set screws, engaged in threaded holes near the ends of a main nut block, adjustable from above, and extending downwardly to bear on the surface of a flat landing which is typically machined in the neck, extending toward the first fret region and forming a vertical riser that steps up to the fingerboard level. The set screws function as adjustable support legs set to hold the bottom surface of the nut block raised above the landing surface by a small space that ensures adjustability.

In the primary embodiment, the nut block is stabilized for orientation perpendicular to the fingerboard and horizontal constraint by a stabilizing flange, extending integrally from the bottom region of the nut block forming a cantilever directed toward the body of the instrument. The stabilizing flange is secured to a central region of the neck landing in a “floating” manner utilizing a thick compressible member, such as a washer of rubber-like material or spring spacer made of metal, held under compression by an adjustable fastening screw traversing the flange and spacer and threadedly engaging the neck/fingerboard. The two set-screws and the fastening screw holding the flange thus form a triangular nut support system. Stabilization against rotation is provided by abutting the edge of the flange against the vertical riser at the edge of the landing.

The string support channels are preferably made in a V-shape that can accommodate all sizes of strings with precise center-to-center spacing assured; furthermore the V-shape automatically provides greater fret clearance for the larger vibrational excursion of the large lower frequency strings.

For a stringed instrument with more than six strings and/or with the strings arranged in two tuning groups, and particularly for stringed instruments designed to be played with a two-handed tapping technique, such as The Chapman Stick, two of the improved nut units can be deployed end-to-end, each dedicated to a tuning group: these can each be adjusted independently by the two set screws along with the third stabilizing screw adjustment for optimal string-to-fret clearance.

The string spacing between the two string tuning groups can be made uniform with the other strings or else increased by spacing the two nut units further apart.

In alternative embodiments, the nut block may be made without the stabilizing flange, and the stabilizing functions may be provided by various fastening configurations located in within the immediate region of the nut block. Hardware for stabilization may be located in line with the adjustment screws immediately beneath the nut ridge line. The perpendicular orientation can be stabilized by utilizing a pin or fastening screw that is closely constrained in sufficiently long holes both the nut block and the neck, while the anti-rotational stabilization can be implemented by abutting the nut block against the step riser of the landing, or by utilizing two doubly-constrained pins, fastening screws or set screws.

BRIEF DESCRIPTION OF THE DRAWINGS

The above and further objects, features and advantages of the present invention will be more fully understood from the following description taken with the accompanying drawings in which.

DETAILED DESCRIPTION

Figure 1:
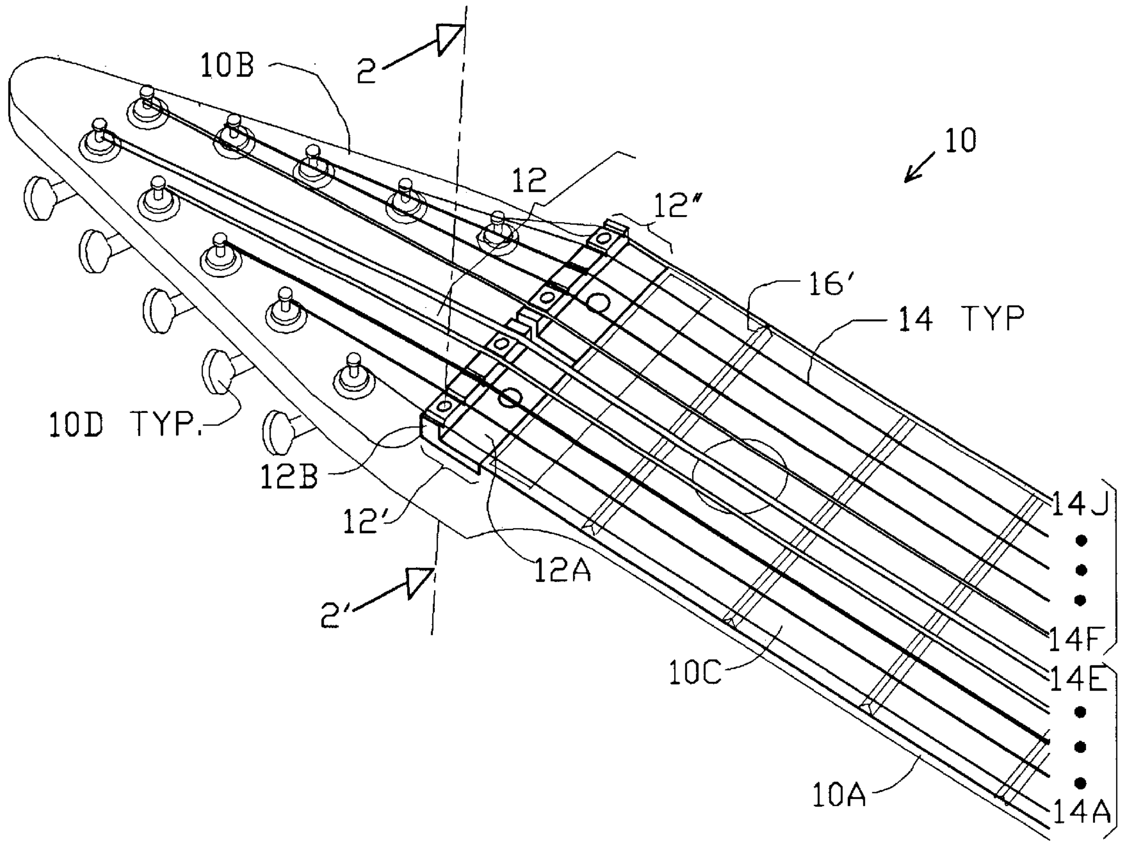
FIG. 1 is a perspective view of the neck end portion a musical instrument with ten strings arranged in two tuning groups, fitted with an adjustable nut assembly in accordance with a primary embodiment of the present invention wherein two flanged nut units are deployed end-to-end on a recessed neck landing.

FIG. 1 is a perspective view of a portion of a ten-stringed musical instrument 10 such as The Chapman Stick, including a portion of neck 10A along with the integral headstock 10B and fingerboard 10C, A nut assembly 12 includes two identical nut blocks, 12' and 12", supporting a total of ten strings, 14A–J, arranged in two five-string groups, one supported on nut block 12' and the other supported on nut block 12". In each five-string group, the diameter of the strings 14 increases progressively, i.e. from the small-diameter highest-pitched string 14A to the large-diameter lowest-pitched string 14E in the first tuning group on nut block 121, and from small-diameter highest-pitched string 14J to the large-diameter lowest-pitched string 14F of the second tuning group on nut block 12".

The strings 14 are typically spaced uniformly center-to-center in each tuning group, however the adjacent strings 14E and 14F of the two tuning groups can be set either to the uniform spacing or to a greater separation, as determined by the end-to-end separation between nut blocks 12' and 12".

Each nut block 12'/12" is configured with a stabilizing flange 12A extending from the bottom region of its main body toward the first fret 16'. The strings 14 are supported in channels machined into the top of the nut blocks 12'/12", and, in accordance with the present invention, nut blocks 12'/12" are made to be independently height-adjustable for the purpose of setting correct string clearances from the first fret 16' for a desired playing action.

The strings 14 are directed in the headstock region to tie posts of corresponding tuning winch mechanisms of known technology, each manually adjustable via a peg 10D for tensioning and thus tuning the strings 14.

Figure 2:
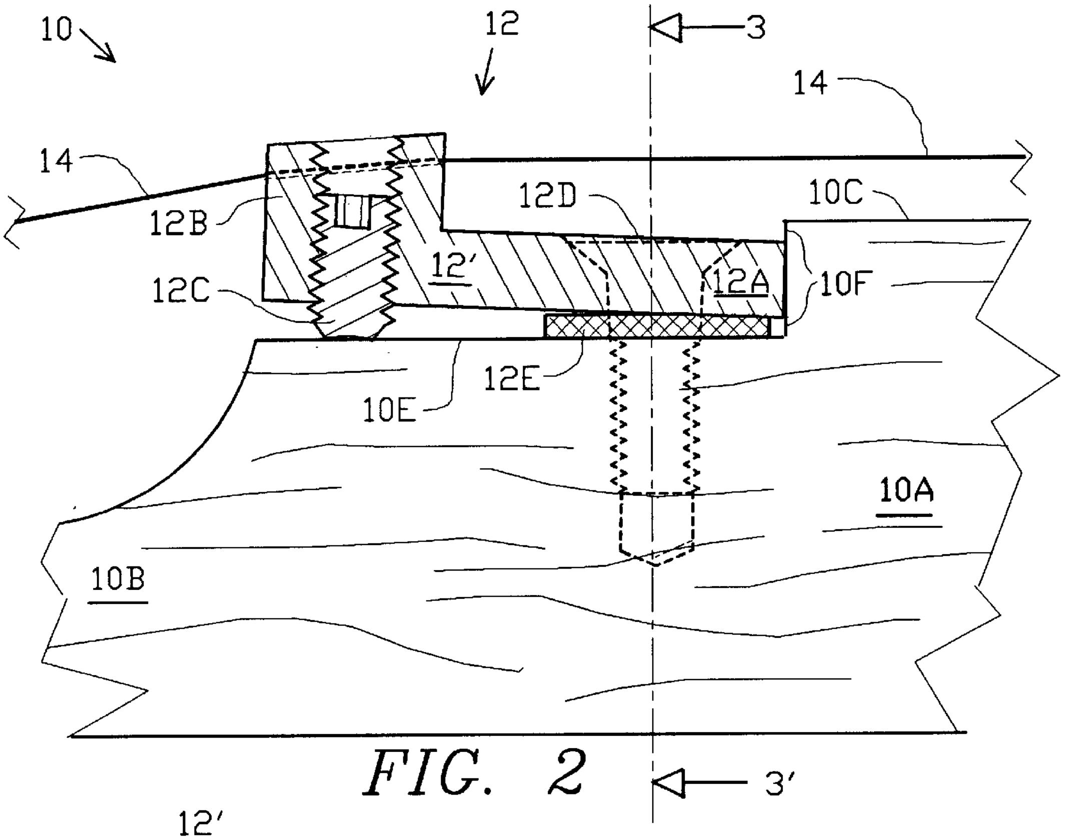
FIG. 2 is a cross-sectional view taken through 2—2' of FIG. 1 showing the nut unit support and stabilization details.

FIG. 2, taken through 2—2' of FIG. 1, shows the cross-sectional shape of nut block 12'; this shape also applies to the other nut block 12" since the two nut blocks 12' and 12" of nut assembly 12 are typically made identical, having a flange 12A extending from the bottom region of main body portion 12B. In the upper region, a nut ridge, with a generally flat top surface sloping downwardly toward the headstock 10B as shown, is configured with a row of channels in which the strings 14 are supported. The strings 14 are then directed into the region of the headstock 10B at a somewhat steeper downward slope to the tuning winches.

Nut block 12' is adjustably supported on a landing 10E, machined into the neck 10A, by a three-point elevation system of which two of the points are implemented by a pair of set-screws 12C, engaged in threaded holes in the nut block 12', while the third point is implemented by a fastening screw 12D, shown in the background in dashed lines, traversing the flange 12A and a compressible spacer 12E. Fastening screw 12D is threaded into a hole extending from the landing 10E down into the neck 10A. The driver recess in the set-screws 12C and in the head of fastening screw 12D may be any standard type such as Allen hex, Phillips, square or slot.

In initial assembly, before fastening screw 12D is tightened down, the three-point elevation system thus formed can be rocked in all directions for the subtle height adjustments, then, as the middle fastening screw 12D is tightened down, the nut block 12' becomes resiliently constrained, providing stability by compressing spacer 12E between the bottom of flange 12A and landing 10E.

Because the two set-screws 12C form a fulcrum line that is located directly under the V-shaped channels, the height of strings 14 above the fingerboard 10C is barely affected by tightening of the fastening screw 12D to compress the underlying spacer 12E.

It is preferred to conclude the setup procedure with the fastening screw 12D tightened to compress spacer 12E sufficiently to tilt the nut block 12' so as to be slightly higher at the main body portion 12B as shown, so that the small angle formed between the bottom surface of nut block 12' and the landing 10E serves as a readily-visible positive indication that both set-screws 12C are properly deployed: i.e. extending downwardly and supporting the nut block 12' firmly on the landing 10E in the manner intended, while spacer 12E acts as a resilient third support member. Abutment of flange 12A against the vertical wall of step 10F, formed at the edge of landing 10E, prevents the nut unit 12' from shifting rotationally about the fastening screw 12D.

Figure 3:
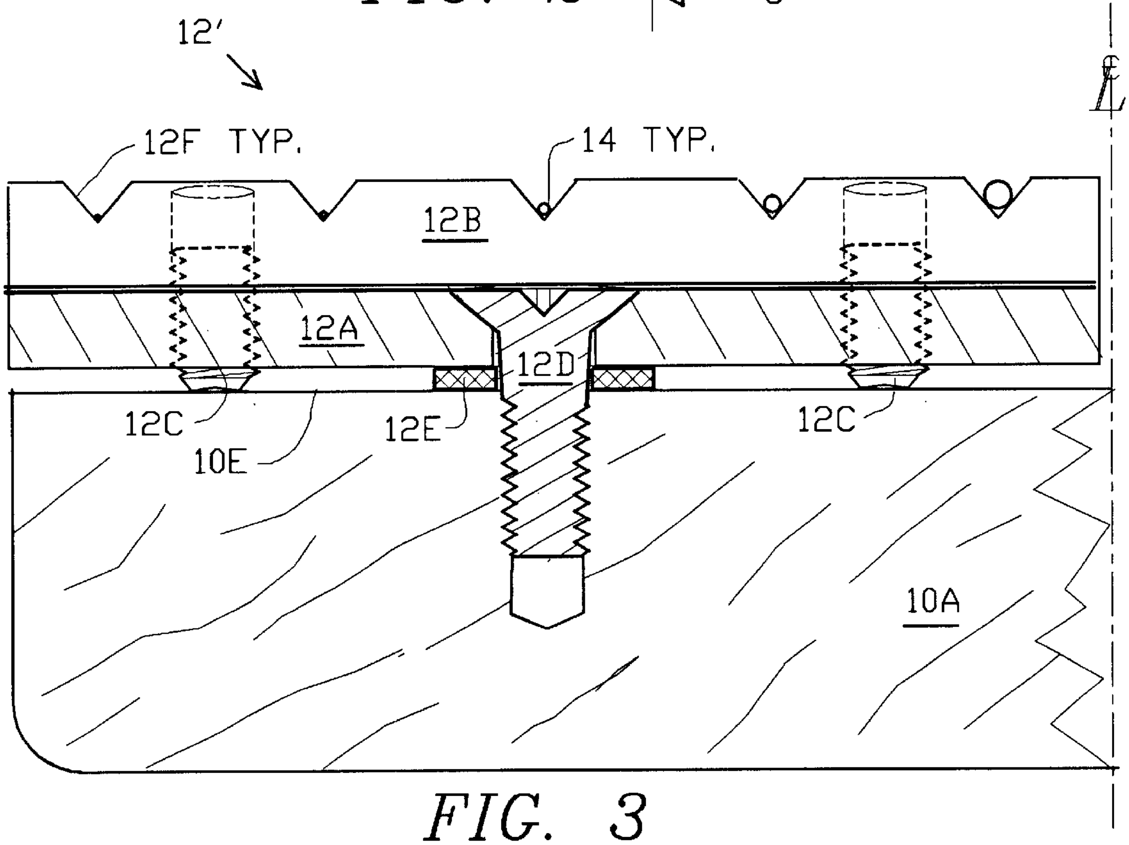
FIG. 3 is a cross-sectional view taken through 3—3' of FIG. 2, showing one of the two nut units as a half-portion of the nut assembly of FIG. 1.

FIG. 3, a cross-section taken at 3—3' of FIG. 2, shows one nut block 12' as a half-portion of the full nut assembly (12 FIG. 1) that extends across the full width of neck 10A. Shown is the cross-section of stabilizing flange 12A and fastening screw 12D, with main body portion 12B of nut unit 12' in the background, seen configured at the top with five V-shaped string support channels 12F supporting strings 14. Fastening screw 12D traverses a clearance hole in flange 12A, and compressible spacer 12E, between the landing 10E in neck 10A and the bottom surface of flange 12A. Compressible spacer 12E can be made rectangular, square or as a round washer, and may be made from resilient material such as rubber or neoprene. Alternatively, spacer 12E could be implemented in the form of a steel coil spring or arched spring metal spacer.

It is to be noted that the support provided by the V-shape of the uniform channels 12F automatically holds the string elevated such that the bottom of the string is spaced above the bottom of the V-shaped channel 12F by a vertical increment that is proportional fraction of the string diameter, and that depends on the angle of the V. This fraction can be calculated from the geometric relationship $h/d=(\sec(a/2)-1)/2$, where h is the vertical increment, d is the string diameter, and a is the total angle of the V channel. (sec i.e. secant is the inverse of sin).

Thus a 90 degree total angle in the V channel 12F provides additional string elevation amounting to approximately 20.7% of the string diameter. Consequently, if the transverse orientation of nut block 12' is set to be level, i.e. parallel across the landing 10E, the bottoms of the thicker strings, e.g. 14E and 14F, will have greater clearances above the first fret, allowing unimpeded vibration of the thicker strings with their greater excursions. With a variety of string gauges, the transverse orientation of the nut block 12B is tilted by height adjustment at each end via set screws 12C for the desired first-fret-to-string clearances, contributing to best overall playing action.

For instruments such as guitars with fretboards or fingerboards having a convex arched shape, the triangular mounting system will generally accommodate the curvature; however for uniform string-to-fret clearance, the nut assembly should ideally support the strings in a convex curvature corresponding to the frets rather than a straight line. For this purpose, the nut assembly could be made with the required top curvature and/or implemented as two nut blocks and/or, if necessary, the channel depths could be varied as required, e.g. located on a curved line instead of on a straight line.

There are several alternative configurations in which the invention can be practiced without sacrificing its benefits and advantages or departing from its basic principles, subject to the following considerations.

The nut block 12' needs to be totally constrained in all directions. In the primary embodiment it is constrained horizontally by the fastening screw 12D in conjunction with tight abutment of flange 12A against the vertical surface of landing step 10F extending from the landing 10E to the fingerboard 10C; and is constrained vertically in a bilateral manner at each of the three support points in the support triangle. Constraint against downward movement is provided by the two set-screws 12C and the compressed spacer 12E bearing downwardly on the landing 10E, while constraint against upward movement is provided by the downward pressure of the tensioned strings on the saddle-notches located above the set-screws 12C and by the head of fastening screw 12D holding down the flange 12A.

There is a secondary requirement for pre-retention, i.e. holding nut block 12' from becoming separated from the neck 10A before the strings are installed in manufacture and in field service, re-stringing and repair operations.

The primary support of the nut block on the neck 10A needs to be direct and rigid, rather than resilient, for acoustical timbre and sustain, and for precise height adjustment, especially in the guitar family where open strings are played; however even in tapping type instruments, where the open string positions are not normally played, it is important that the precise height setting be preserved by securing the nut block(s) in a firm and stable manner.

In an alternative configuration relating to FIG. 3, the fastening screw 12D or its equivalent could be inverted, i.e. deployed in a clearance hole in the neck 10A and engaging the nut block 12', typically by a threaded fastening member.

In another alternative arrangement, instead of fastening screw 12D and compressible spacer 12E, the third support point could be implemented by a set-screw or equivalent. All three set-screws could be implemented identically, either in threaded holes in the nut block as shown for set-screws 12C in FIG. 2, or inverted, i.e. in threaded holes in neck 10A. The tripod support would provide the necessary stabilization to hold the nut block upright. To prevent horizontal shifting, constraint cavities in the landing could be provided to accept the set-screws tips. This could provide horizontal stabilization that no longer depends on the abutting relation of the stabilizing flange 12A and the landing step 10F. In that implementation, since retention of the nut block at all three support points would rely entirely on downward pressure from the tensioned strings on the main body of the nut block, pre-retention could be provided in a separate manner such as by suitable hardware or by a relatively soft spacer with double-sided adhesive deployed between the nut block and the landing.

While the primary embodiment shown in FIGS. 1–3 has the nut block 12' basically supported at two adjustable points implemented by two set-screws, supplemented by a third support/stabilizing point implemented by a fastening screw and compressible spacer constraining the stabilizing flange 12A extending from the nut block 12' for maintaining the upright orientation of the nut block 12' substantially perpendicular to the neck, the invention can be practiced in an secondary embodiment wherein nut block is configured without a flange, and provides adjustable two-point support along with the necessary constraints implemented in an alternative manner.

Figure 4:
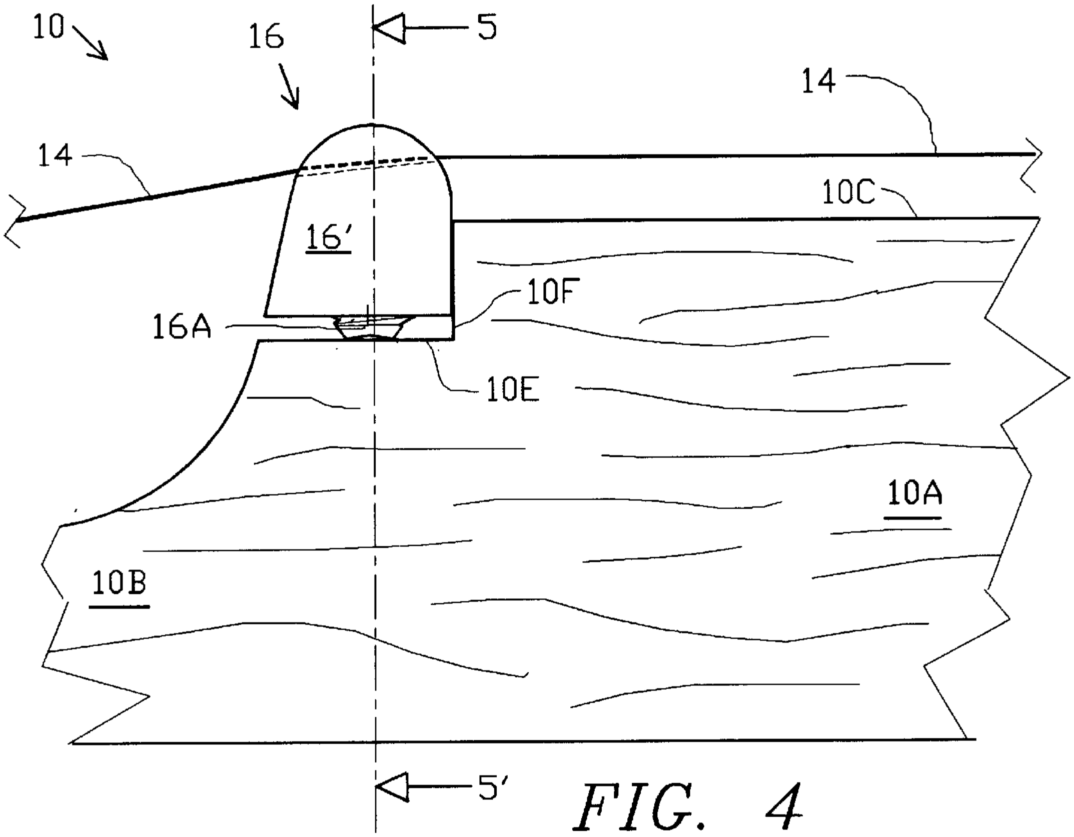
FIG. 4 is a side view of the nut region of a stringed instrument illustrating a second embodiment of the invention wherein the nut block is flangeless.

FIG. 4 is a side elevational view of a the nut region of a stringed instrument fitted with a nut assembly 16 configured according to a secondary embodiment of the invention that utilizes a flangeless nut block 16' abutting a step 10F of a relatively short landing 10E. As in the primary embodiment, nut block 16' is adjustably supported on set-screws 16A and configured on top with V-shaped channels supporting strings 14 in essentially the same manner as previously described; however the nut ridge in the upper portion of nut block 16' is configured with an alternative rounded cross-sectional shape rather than the sloped flat top surface described above.

Figure 5:
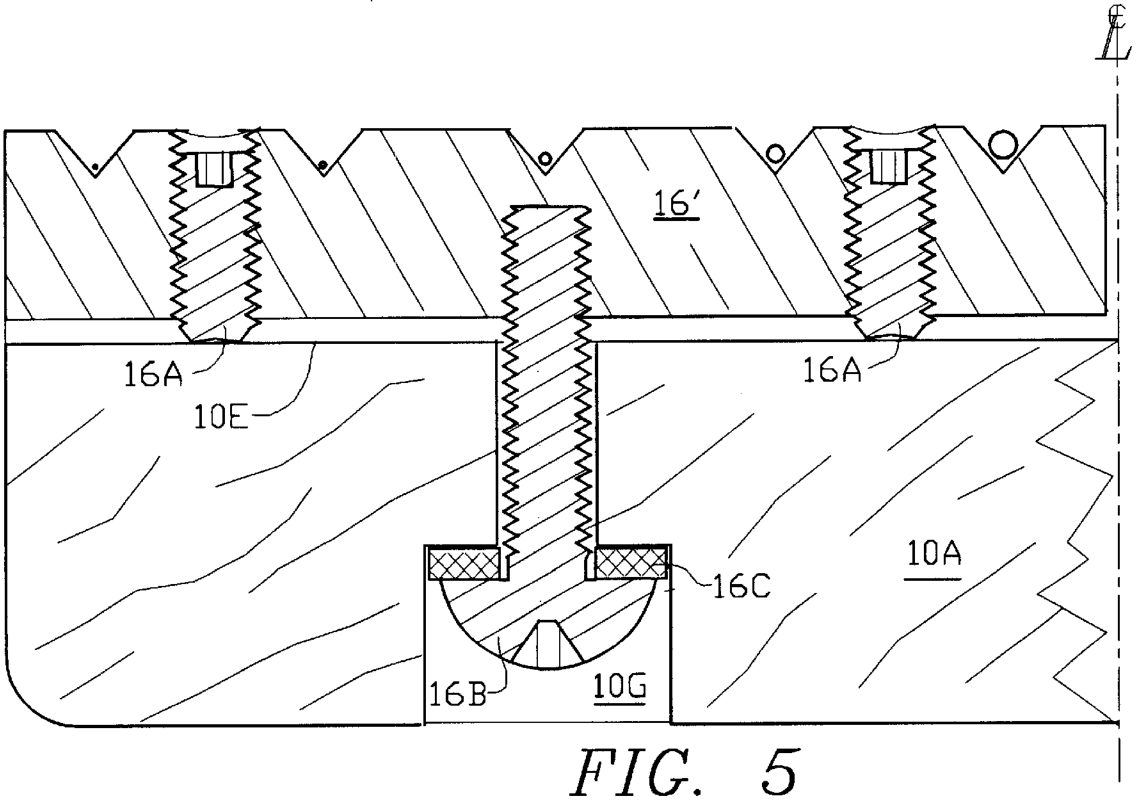
FIG. 5 is a cross-section through axis 5—5' of FIG. 4 illustrating a version of the second embodiment that utilizes a rear-accessed central fastening screw for stabilization and positive retention.

FIG. 5 is a cross-section through axis 5—5' of FIG. 4 showing nut block 16' supported on set-screws 16A and utilizing a fastening screw 16B, located midway between set-screws 16A, that provides both horizontal and perpendicular stabilization as well as pre-retention. The set-screws 16A are deployed as adjustable legs in the same manner as described in connection with FIGS. 2 and 3.

Fastening screw 16B, inserted from below through a clearance hole with its head recessed in a clearance cavity 10G in the neck 10A, engages a blind threaded hole in nut block 16'. Optionally screw 16B and the mating threaded hole can be dimensioned such that screw 16B is intended to be driven fully to a home position with its upper end tightened against the closed upper end of the threaded hole as shown. A compressible washer 16C between the head of screw 16B and the adjacent region of neck 10A provides a range of vertical resilience to allow for adjustment of setscrews 16A.

Fastening screw 16B constrains the nut block 16' against horizontal shifting in any direction, and, in conjunction with abutment of nut block 16' against the landing step (10F, FIG. 4), prevents nut block 16' from rotating about the fastening screw 16B.

The adjustment procedure for the second embodiment shown in FIGS. 4 and 5 is essentially the same as that described above in connection with in FIGS. 2 and 3 for the primary embodiment.

In an alternative configuration relating to FIGS. 2–5, one or more of the set-screws or functional equivalents could be inverted, i.e. deployed in threaded holes in the neck, accessible for adjustment from the rear, and made to bear against the bottom of the nut block.

Whereas the foregoing examples are provided with positive pre-retention for holding the nut block(s) in place whenever there are no strings installed, there are alternative stabilizing systems wherein the pre-retention depends on friction rather than positive captivation. However once the strings are in place, this difference is of no consequence in normal usage, and if a sufficient level of friction is provided, it may be considered workable and thus acceptable in manufacture and field service.

Figure 6:
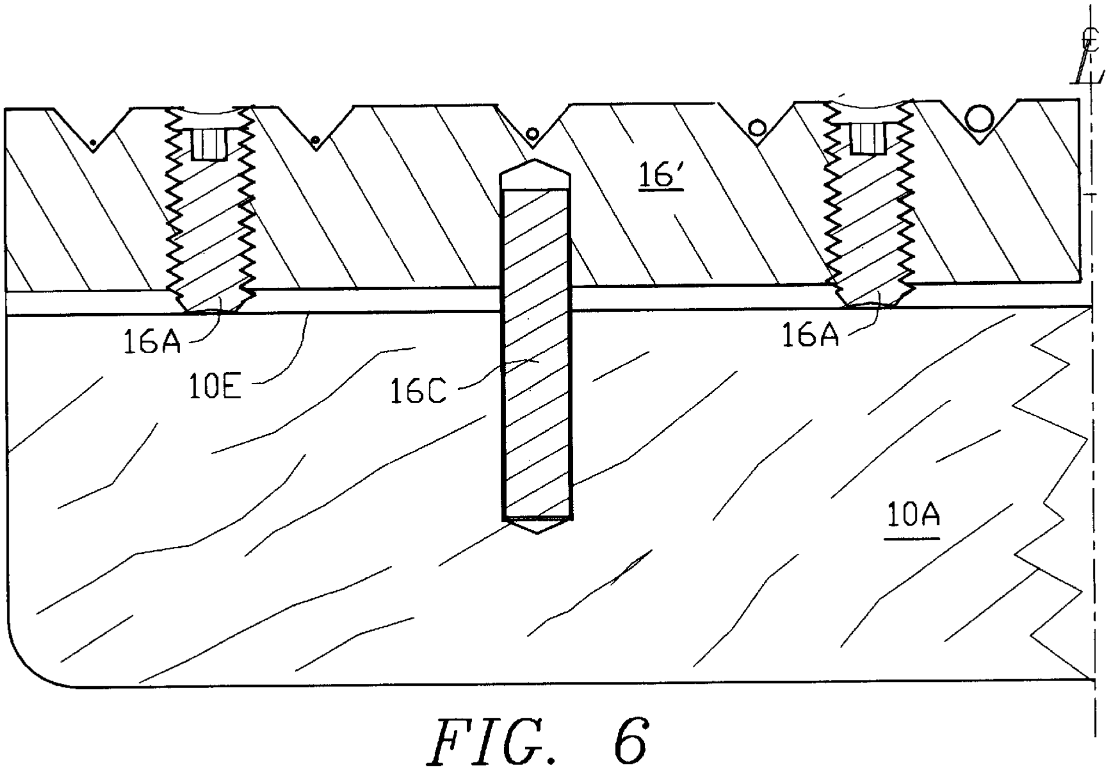
FIG. 6 is a cross-section through axis 5—5' of FIG. 4 illustrating an alternative version of the second embodiment that utilizes a captive central pin for stabilization.

FIG. 6 is a cross-section, taken in the same plane as FIG. 5, of a second version of the second embodiment of FIG. 4, utilizing a plain cylindrical pin 16C, typically made of steel or other metal, constrained in close-fitting holes: at the top end in the nut block 16' and at the bottom end in neck 10A. This version provides both horizontal and perpendicular stabilization, while relying on abutment against the landing step (10F FIG. 4) for anti-rotation.

This version provides only frictional retention of nut block 16' in the absence of strings, compared to the positive retention provided in foregoing embodiments and their versions. However, with reasonably close-fitting of pin 16C and snug abutment of the nut block 16' against the landing step (10F FIG. 4), the frictional retention of nut block 16' can be expected to prove sufficient for practical purposes in manufacturing and service repair operations.

Figure 7:
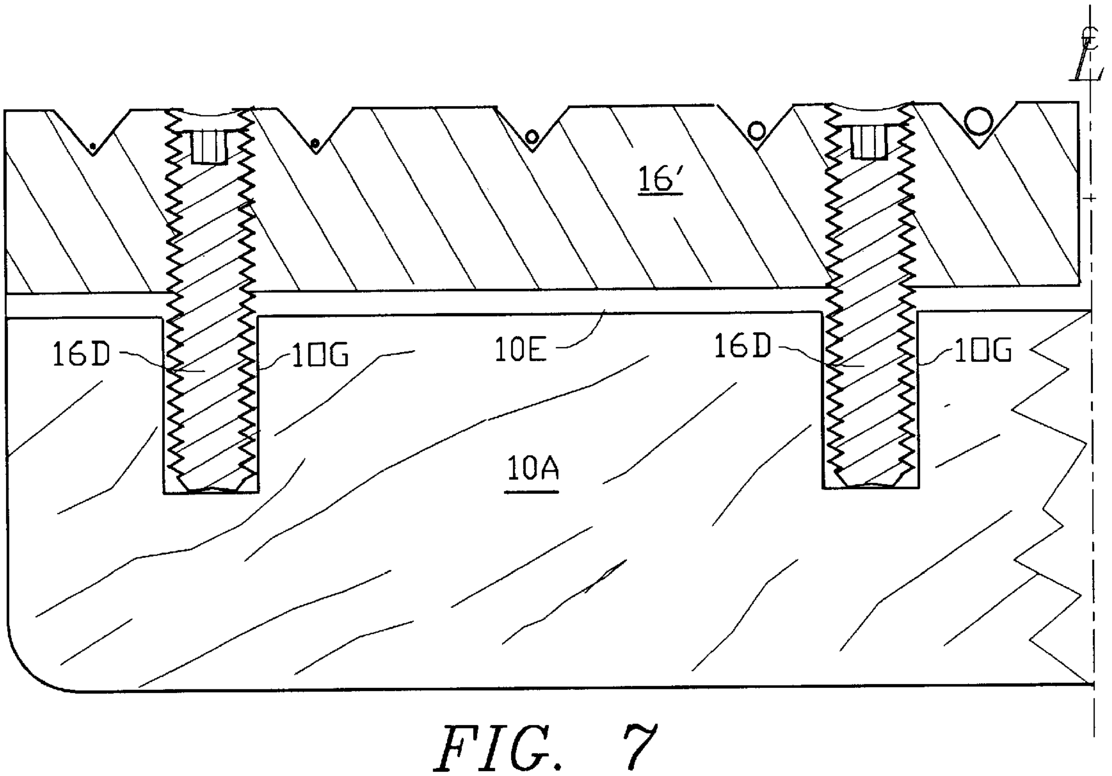
FIG. 7 is a cross-section through axis 5—5' of FIG. 4 illustrating an alternative version of the second embodiment that utilizes a pair of long doubly-constrained set-screws for stabilization.

FIG. 7 is a cross-section of an alternative form in which the second embodiment of FIG. 4 may be practiced, and which provides horizontal constraint, perpendicular stability and anti-rotational stability without requiring abutment against the landing step (10F FIG. 4).

The two relatively long set-screws 16D are both constrained closely at each end in relatively long holes: the upper end in the threaded hole in nut block 16', generally in the manner previously described, while the extended lower end is constrained in the close-fitting blind clearance hole 10G in the neck 10A. The lower end of the set-screw 16D bears on a substantially flat bottom in the hole 10G. The two set screws 16D, adjustable from the top, thus provide all the necessary constraints for stability along with frictional retention generally as described in connection with FIG. 6; however in this case the retention is inherently enhanced by the friction provided by the considerable length of the two threaded shafts of set-screws 16D in each of the close-fitting clearance holes 10G.

In an alternative implementation based on the approach shown in FIG. 7, the holes in the neck 10A could be threaded and made to continue through to the bottom, while the corresponding holes in the nut block 16' could be made blind with a bearing surface at the top end instead of continuing to an opening at the top of nut block 16', and dimensioned for a close clearance fit. For this configuration, the set-screws 16D would be inverted, and would be rear-accessible for adjustment.

Figure 8:
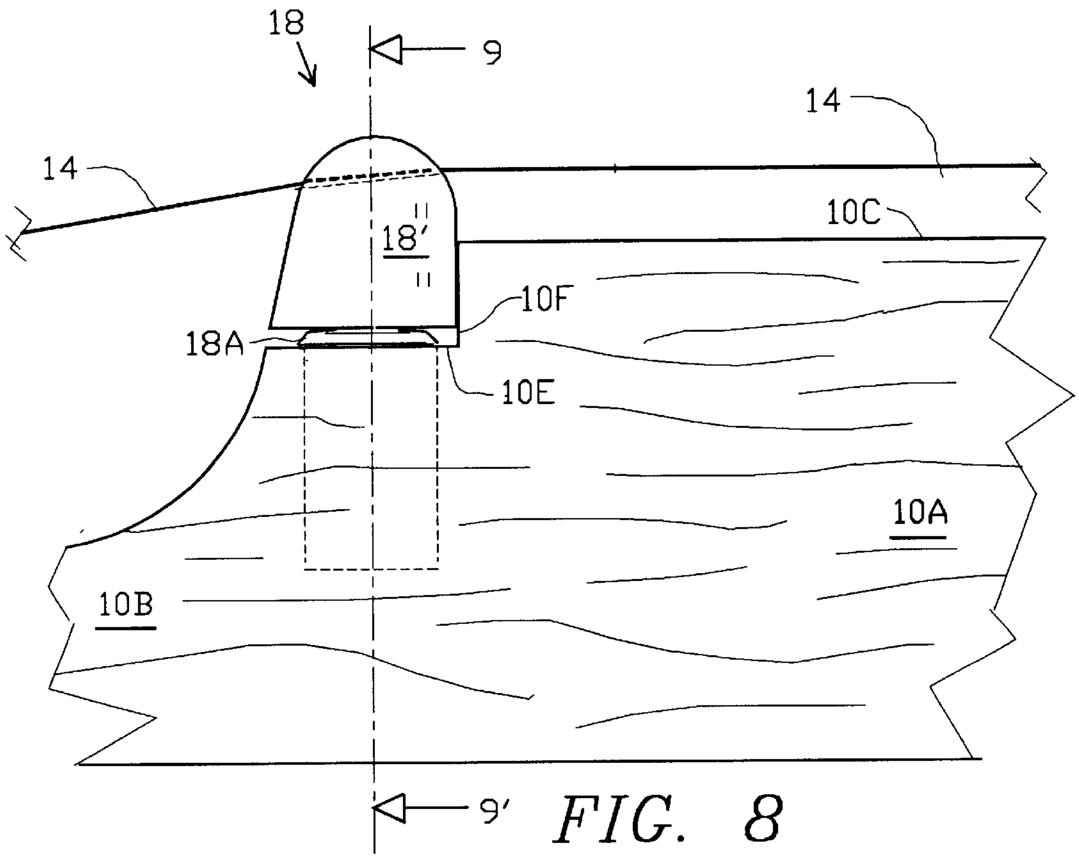
FIG. 8 is a side view of the nut region of a stringed instrument, illustrating an alternative version of second embodiment of the invention, similar in appearance to FIG. 4, that provides set-screw locking, and that is accessed from the rear for height adjustment.

FIG. 8 is a side view of the nut region of a stringed instrument, illustrating a version of the second embodiment of the invention wherein the nut assembly 18 utilizes a flangeless nut block 18', supported by a pair of relatively large set-screws 18A threaded into the neck 10A. This version provides anti-rotation, horizontal and perpendicular constraint, positive pre-retention and set-screw locking.

Figure 9:
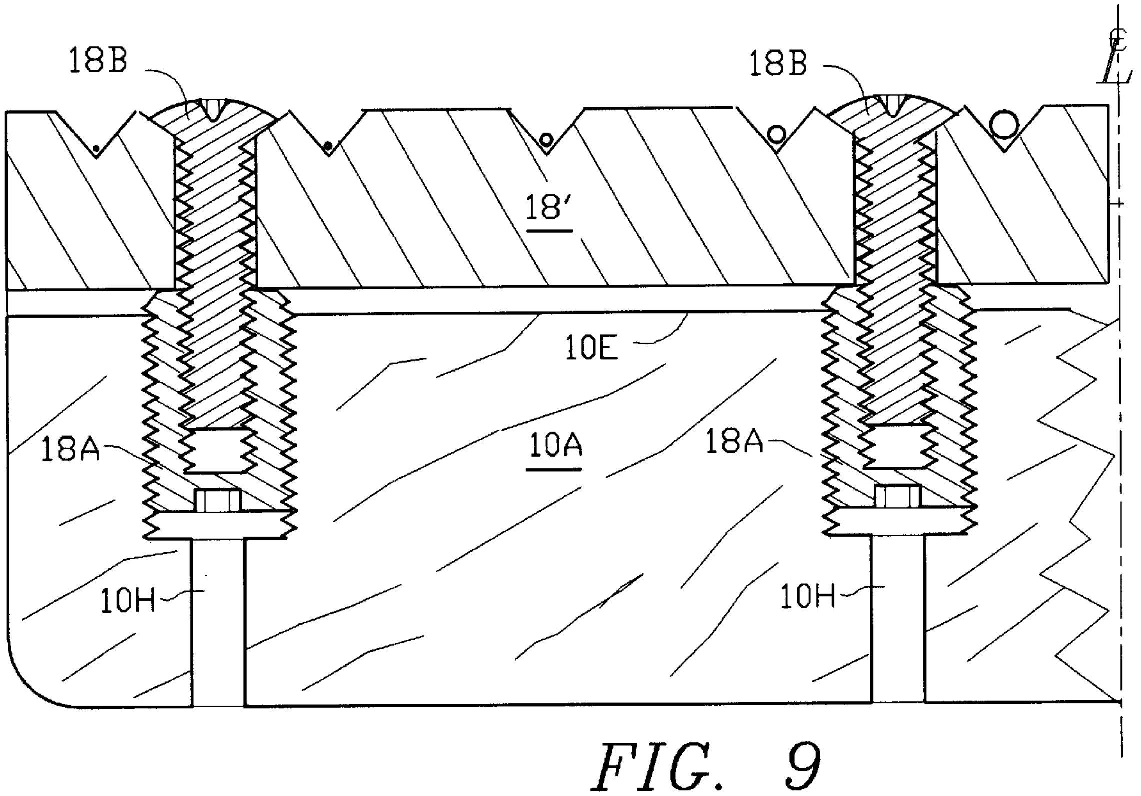
FIG. 9 is a cross-section taken through 9—9' of FIG. 8 showing the details of the adjustable nut block with rear adjustment access and fastening screws that lock the set screws against the bottom of the nut block.

FIG. 9 is a cross-section taken through 9—9' of FIG. 8 showing the pair of special large set-screws 18A, engaging threaded holes in the neck 10A. A driving recess configured in the bottom end of each set-screw 18A is adjustable by a tool inserted from the rear through access hole 10H. The set-screws 18A are each configured with a threaded internal bore extending to a top bearing surface which is held securely against the bottom surface of nut block 18' by a machine screw 18B. This top bearing surface of set-screw 18A may optionally be made with a slightly rounded or beveled crown to allow for end-to-end tilt adjustment.

As in the foregoing embodiments, the driver cavities in set screws 18A and the head of screws 18B may be any standard type such as Allen hex, Phillips, square or slot.

Screws 18B, shown as oval head as one of the options, act as locking screws that can be tightened securely to prevent any unwanted rotation of set-screws 18A. Screws 18B must be loosened slightly to allow adjustment of set-screws 18A, but even while loosened, screws 18B still act to retain and constrain nut block 18' horizontally and anti-rotationally while the nut block 18', supported on the relatively large upper bearing surfaces of set-screws 18A, remains perpendicularly stable, constrained also by the close fit of screw 18B in the clearance holed in nut block 18'.

Following adjustment, the tightening down of screws 18B secures the nut block 18' firmly to each set-screw 18A and thus locks the set screws 18A against unwanted rotation.

In any of the embodiments, as alternatives to set-screws, other screw types such as machine screws, knurled thumb-wheel screws or mechanisms other than screws, e.g. inclined planes, could be utilized in an equivalent manner to practice the invention.

As an alternative to the straight sides shown on the V-shaped channels, these sides could be shaped with a curvature, either concave or convex; this would modify the relationship between string thickness and the bottom clearance at the first fret. Instead of uniform spacing and uniform saddle notch depth, the invention could be practiced with these parameters customized to any desired criteria. As an alternative to the channels being configured with their walls and bottom in a straight line along the direction of the strings as shown, the channels could be configured with a convex curvature.

The shape shown for the nut blocks represents only an illustrative embodiment: the invention could be practiced with these having various functionally equivalent and viable cross-sectional shapes, such as inverted-U, inverted-V (triangular) or circular.

Wherever a set screw bears against a wooden surface, such as landing 10E, it would be an optional matter of design choice to provide a metal bearing member, e.g. a bearing plate. Similarly, instead of threaded holes in the wooden neck 10A it would be a matter of design choice to utilize threaded metal insert bushings.

The invention can be practiced with any desired total number of strings, any desired number of nut blocks and any desired number of strings per nut block.

In any of the embodiments, the space allowed for adjustment between the nut block and the underlying landing surface could be filled with a soft compressible spacer gasket or equivalent for the aesthetic purpose of filling the gap that otherwise appears around at least three sides at the bottom of the nut block.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. An improved nut assembly in a musical instrument having a neck that extends from a body region of the instrument to a headstock disposed at an end of the neck, the neck being configured with an upwardly facing frontal surface constituting a fingerboard, the musical instrument having a plurality of strings supported under tension side-by-side above the fingerboard, substantially parallel thereto, said nut assembly comprising:

an elongate nut block, located in transverse disposition between the headstock and the fingerboard, having a cross-sectional shape defining a main body portion extending upwardly to an upper region constituting a nut ridge supporting the strings;

stabilizing means for securing said nut block onto the neck, maintained substantially perpendicular thereto;

string spacing means for constraining each of the strings laterally along the nut ridge; and variable nut block support means for supporting said nut block at two support points thereof located near opposite ends of said nut block, each at an independently adjustable spacing above a designated support plane in said neck, so as to enable setting and holding the strings supported at predetermined respective spacings above the fingerboard in a region thereof adjacent said nut block, such as to provide optimal playing action and desired string clearances for unimpeded string vibration.

2. The improved string support nut assembly as defined in claim 1 wherein said variable nut block support means comprises:

a flat horizontal support landing configured in the neck at the designated support plane in a region beneath said nut block, extending to a transverse vertical surface of a landing step riser formed in the neck, extending from the landing upwardly to the fingerboard; and a pair of set-screws, engaged in corresponding vertical threaded holes located in opposite end regions of said nut block, made and arranged to protrude downwardly and to support said nut block on said support landing so as to provide a spacing therebetween that can be adjusted by rotating said set-screws for setting up the desired string clearances.

3. The improved string support nut assembly as defined in claim 2 wherein said stabilizing means comprises:

a stabilizing flange configured on said nut block, disposed closely above said support landing, extending from the nut block in a generally horizontal direction toward the body region to an edge that is made to abut the landing step riser for anti-rotational purposes;

a compressible spacer disposed between said flange and said support landing: and fastening means for constraining said flange against upward movement, made and arranged to press said flange downwardly onto said compressible spacer in a manner to compress said compressible spacer to a desired extent so as to form with said set-screws a triangular support system to stabilize and facilitate height adjustability of said nut block relative to the landing in order to set up and secure the desired string clearances.

4. The improved string support nut assembly as defined in claim 3 wherein said fastening means comprises a fastening screw, traversing the flange of said nut block and said compressible spacer, threadedly engaging the neck and driven to sufficient engagement to compress said compressible spacer to a desired extent so as to form with said set-screws a triangular support system to stabilize said nut block and facilitate adjustability in setting up said nut assembly relative to the landing in order to attain the desired string clearances.

5. The improved string support nut assembly as defined in claim 3 wherein said string spacing means comprises a plurality of string-retaining channels configured in a row along the nut ridge, each supporting and laterally constraining a corresponding one of the strings.

6. The improved string support nut assembly as defined in claim 5 wherein each of said string-retaining channels is configured with a V-shaped cross-section.

7. The improved string support nut assembly as defined in claim 5 wherein said string-retaining channels are spaced apart uniformly.

8. The improved string support nut assembly as defined in claim 5 wherein said nut block is configured with:

an approximately horizontal bottom surface;

an approximately vertical first surface facing toward the body region, extending upwardly from the flange, an approximately vertical second surface facing toward the headstock, extending upwardly from a bottom surface; and a substantially planar top surface, extending on a downward slope from the first surface to the second surface, configured with said string-retaining channels, each extending on the downward slope from the first surface to the second surface.

9. An improved nut assembly in a musical instrument having a neck extending from a body region of the instrument to a headstock disposed at an end of the neck, the neck being configured with an upward frontal surface constituting a fingerboard, the instrument having a plurality of strings with different diameters supported under tension side-by-side above the fingerboard and substantially parallel thereto, said nut assembly comprising:

a pair of elongate nut blocks, aligned end-to-end in transverse disposition between the headstock and the fingerboard, each having a cross-sectional shape extending upwardly to an upper edge constituting a nut ridge supporting the strings; each said nut block comprising:

stabilizing means for holding the nut block substantially perpendicular relative to the fingerboard, made and arranged to constrain said nut block against horizontal movement relative to the fingerboard;

string spacing means for constraining each of the strings laterally; and variable nut support means for supporting said nut block at two support points thereof located near opposite ends of said nut block, each at an independently adjustable spacing above a designated support plane in said neck, so as to enable setting and holding the strings supported at predetermined respective spacings above the fingerboard in a region thereof adjacent said nut block, such as to provide optimal playing action and desired string clearances for unimpeded string vibration.

10. The improved string support nut assembly as defined in claim 9 wherein, in each said nut block, said variable nut support means comprises:

a flat horizontal support landing configured in the neck at the designated support plane in a region beneath said nut block, extending to a step riser, formed in the neck, that extends upwardly from said landing to the fingerboard; and a pair of set-screws engaged in corresponding vertical threaded holes located in opposite end regions of said nut block, made and arranged to protrude downwardly and support said nut block on said support landing so as to provide a spacing therebetween that can be adjusted by rotating said set-screws for setting up the desired string clearances.

11. The improved string support nut assembly as defined in claim 10 wherein, in each said nut block, said stabilizing means comprises:

a stabilizing flange configured on said nut block, disposed closely above said support landing, extending from said nut block in a generally horizontal direction toward the instrument body to an edge that is made to abut the landing step riser;

a compressible spacer disposed between the flange of said nut block and said support landing: and fastening means for constraining said flange of said nut block against upward movement, made and arranged to press downwardly onto said compressible spacer in a manner to cause said flange to compress said compressible spacer to a desired extent so as to form with said set-screws a triangular support system to stabilize and facilitate adjustment of said nut block relative to said support landing in order to set up and secure the desired string clearances.

12. The improved string support nut assembly as defined in claim 11 wherein, in each said nut block, said fastening means comprises a fastening screw, traversing the flange of said nut block and said compressible spacer, threadedly engaging the neck and driven to sufficient engagement to compress said compressible spacer to a desired extent so as to form with said set-screws a triangular support system to stabilize and facilitate adjustable setup of said nut block relative to said support landing in order to attain the desired string clearances.

13. The improved string support nut assembly as defined in claim 11 wherein, in each said nut block, said string spacing means comprises a plurality of string-retaining channels configured in a row along the nut ridge, each supporting and laterally constraining a corresponding one of the strings.

14. The improved string support nut assembly as defined in claim 13 wherein each of said string-retaining channels is configured with a V-shaped cross-section.

15. The improved string support nut assembly as defined in claim 13 wherein, in each said nut block, said string-retaining channels are spaced apart uniformly.

16. The improved string support nut assembly as defined in claim 13 wherein each said nut block is configured with:

a bottom surface, an approximately vertical first surface facing toward the instrument body region, extending upwardly from the flange;

an approximately vertical second surface facing toward the headstock, extending upwardly from a bottom surface; and a top surface configured with a row of string-support channels, each channel extending on a downward slope from the first surface to the second surface.

17. The improved string support nut assembly as defined in claim 13 wherein said nut blocks are dimensioned and spaced end-to-end such that all of said string-retaining channels are spaced apart uniformly.

18. The improved string support nut assembly as defined in claim 13 wherein the strings are arranged in two tuning groups each characterized by progressive increments in tuning frequency from string to string and by corresponding increments in string diameter, each tuning group being associated with one of said nut blocks.

19. The improved string support nut assembly as defined in claim 18 comprising ten strings arranged in two tuning groups each having five strings, the fingerboard being fitted with a plurality of transverse frets, said nut assembly being made and arranged to provide optimal lateral string separation, and said set-screws and screw fasteners being adjusted in a manner to provide optimal string-to-fret spacing and contribution to overall action for playing the instrument in a two-handed tapping manner.

20. The improved string support nut assembly as defined in claim 19 wherein the two nut blocks are spaced apart such that string spacing between the two tuning groups is made to be greater than the string-to-string spacing in each tuning group.

* * * * *